(12) United States Patent
Venkatraman et al.

(10) Patent No.: US 7,665,091 B2
(45) Date of Patent: *Feb. 16, 2010

(54) CROSS-PROCESS COMMON SYSTEM RESOURCE DATA SHARING

(75) Inventors: Suresh Venkatraman, Redmond, WA (US); Phillip Brian Scott, Bellevue, WA (US); Chad N. R. Knudson, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 1132 days.

This patent is subject to a terminal disclaimer.

(21) Appl. No.: 11/032,102

(22) Filed: Jan. 11, 2005

(65) Prior Publication Data

US 2005/0149942 A1    Jul. 7, 2005

Related U.S. Application Data

(63) Continuation of application No. 09/483,170, filed on Jan. 14, 2000, now Pat. No. 6,920,633.

(51) Int. Cl.
*G06F 9/46* (2006.01)
*G06F 13/00* (2006.01)
*G06F 17/00* (2006.01)

(52) U.S. Cl. ................ 718/104; 711/113; 715/269

(58) Field of Classification Search ............... 718/104; 711/113; 345/471; 715/269
See application file for complete search history.

(56) References Cited

U.S. PATENT DOCUMENTS

| | | | |
|---|---|---|---|
| 5,208,908 A * | 5/1993 | Harrison et al. ........... 345/557 |
| 5,421,012 A | 5/1995 | Khoyi et al. |
| 5,539,428 A | 7/1996 | Bril et al. |
| 5,692,152 A * | 11/1997 | Cohen et al. ............... 711/140 |
| 5,706,462 A | 1/1998 | Matousek |
| 5,754,854 A | 5/1998 | Kanamori et al. |
| 5,909,545 A * | 6/1999 | Frese et al. ................ 709/208 |
| 6,073,148 A * | 6/2000 | Rowe et al. ................ 715/205 |
| 6,199,094 B1 | 3/2001 | Prester-Marshall |
| 6,237,019 B1 | 5/2001 | Ault et al. |
| 6,412,031 B1 | 6/2002 | Grooters |
| 6,430,627 B1 | 8/2002 | Utas |
| 6,574,001 B2 | 6/2003 | Klosterman et al. |

OTHER PUBLICATIONS

Booch, Grady "Design Patterns—Elements of Reusable Object-Oriented Software", Addison-Wesley, 1995, pp. 127-134.

* cited by examiner

*Primary Examiner*—Hyung S Sough
*Assistant Examiner*—Phuong N Hoang
(74) *Attorney, Agent, or Firm*—Shook Hardy & Bacon LLP

(57) ABSTRACT

A system and method is provided for sharing constrained resources between two or more processes running within a common operating environment. The system is implemented by establishing a communications interface to each process sharing the resource data. The method obtains the resource data to be shared from one or more resource sources. In communication with the processes, the communications interface receives resource data requests and processes the requests with the resource data. Finally, the method communicates the processed resource data request, via the communications link, to the requesting process.

8 Claims, 8 Drawing Sheets

CROSS-PROCESS COMMON SYSTEM RESOURCE DATA SHARING

This application is a continuation of application Ser. No. 09/483,170, filed Jan. 14, 2000, now U.S. Pat. No. 6,920,633 from which application priority is thereby claimed.

TECHNICAL FIELD

In general, the present invention relates to computer software, and in particular, to a method and structure for sharing graphic display interface/font resource data utilizing a cross-process font cache server.

BACKGROUND OF THE INVENTION

Personal computers (PCs) such as IBM-compatible PCs typically include hardware devices such as a processor and a memory for implementing various software programs, a principal one being a central operating environment. In turn, the operating environment, or operating system, supports the variety of other software applications such as a word processing program or a spreadsheet program.

Some operating systems include a graphical user interface, described generally as a graphical operating system, which displays various information to the user as a combination of pictures and text which the user can manipulate. Generally, some graphical operating systems instigate an instance of a software application by displaying the various text, graphics and features of the application within a rectangular window. Moreover, some graphical operating systems allow a user to run multiple software applications. For example, a user can work on a word processing application while also working on a spreadsheet application or a database application at the same time. To increase user efficiency and to allow interaction between the multiple applications, some software platforms group two or more applications (e.g., word processing, spreadsheet and database) into a single software package, generally known as a "monolithic" parent process.

In a monolithic parent process, the user selects one or more of the grouped applications and the parent process launches each instance of an application as a separate rectangular window confined within the larger rectangular window of the parent process. Each window within the parent window is referred to as a "child window." One example of a monolithic parent process is Microsoft Corporation's "MS WORKS®" software package. In this software package, a user selects an instance of either a word processing, spreadsheet or database program by clicking on an icon displayed within the parent process. Accordingly, the parent process creates a child window and displays the selected word processing, spreadsheet or database process. To use a second application (or create a second instance of the same process), the user clicks on the appropriate icon and a second child window is created. To the operating system, however, each child window application is treated as part of the single parent process rather than as a separate process. Thus, all the child window applications share the system resources allotted to the monolithic parent process, such as the graphics display interface (GDI)/font resource data utilized to print documents or display characters on a video screen.

Some operating systems, such as Microsoft Corporation's "WINDOWS® 98" or "WINDOWS NT®" operating systems, allow a user to toggle between separate processes running within the operating system by manipulating a task bar or application switching feature. The selected process is displayed as the foremost rectangular window and/or highlighted, while any other open process rectangular windows are either not displayed or are displayed in a lesser fashion. However, in a multiple child window application scenario, the user cannot toggle between the child windows in this manner because they are treated as a part of the monolithic parent process by the operating system. Thus, the effectiveness and desirability of these monolithic software platforms is diminished.

One approach to eliminate the deficiencies associated with monolithic parent processes has been to provide a software platform which implements each instance of an application launched from a parent process as a separate process and not as a child window. For example, each instance of the word processing, spreadsheet or database application is a separate process displayed as a rectangular window within the operating environment and not confined within the parent process window. Thus, the user is able to toggle between the application windows (or any other process windows) by utilizing the task bar of the operating environment.

To the user, the implementation of the word processing, spreadsheet or database applications as separate processes appears similar, if not identical, to the monolithic approach. For example, the user still selects the word processing icon within the base process to create a word processing application. Furthermore, if the user selects the word processing icon a second time, another instance of the word processing application would be created.

Unlike the monolithic approach, however, each application is treated and displayed as a separate process by the operating system. Thus, the operating environment creates and allocates a separate a copy of the necessary system resources, such as the GDI/font resource data, for each process. Each process' system resources are then stored in a central memory location provided by the computer system. Because each PC typically allocates only a limited amount of memory space for all the processes to store individual copies of the system resource data, the implementation of multiple processes can quickly deplete computer memory resources. For example, if a computer allocates 64K of system memory for maintaining process GDI/font resource data, and each copy of the data allocated to the word processing, spreadsheet or database application is 4K in size, the allotted system memory would be depleted after launching only 16 processes. Thus, the GDI/font resource data becomes a system constraint as to how many applications or overall applications within the operating environment can be launched at one time. Additionally, the overall efficiency of the computer system is reduced by the additional processing time required to create and manage multiple copies of the same resource data.

Thus, there is a need for a cross-process resource sharing system and method in which multiple processes can share common resource data irrespective of the number of processes active within an operating system.

SUMMARY OF THE INVENTION

The present invention satisfies the above described need by providing a cross-process constrained resource sharing system having a communications interface to multiple processes, a resource data store and communications interface with an operating environment.

Generally described, the present invention provides a method in a computer system for sharing system resource data between two or more applications running as separate processes. The method obtains the resource data from a source of system resources and stores a shared copy of the resource data. Upon receiving one or more resource data requests from the applications, the method processes the requests by accessing the shared copy of the resource data. Then, the method communicates the processed resource data requests to the respective applications.

In another aspect of the present invention, a method is provided for sharing graphics device interface (GDI)/font resource data between multiple instances of single document interface (SDI) applications. This method obtains a copy of the GDI/font resource data to be shared with at least two of the SDI applications. Upon receiving font data process requests from the SDI applications, the method processes the font data requests using the shared copy of the GDI/font resource data and communicates the processed font data requests to the SDI applications.

In a further aspect of the present invention, a cross-process resource sharing system is provided. The system includes a central data server, a central data store and an update communications server. The central data server establishes a communications link between the central data store and a client application. The central data store contains system resource data and is adapted to communicate at least a portion of the system resource data to the client application over the communications link in response to resource data requests from the client application. The update communications server is connected to the central data server, and the update communications server is connected to a resource source to provide a communications link between the central data server and the resource source.

In yet a further aspect of the present invention, a computer-readable medium is provided. The computer-readable medium has computer-executable instructions for performing the steps of obtaining a copy of resource data from a source of resource data, receiving data process requests from one or more client applications, processing the resource data requests by sharing the copy of the resource data, and communicating the processed resource data requests to the respective applications.

The system and method of the present invention allow multiple SDI applications to share a single copy of the GDI/font resource data. Accordingly, the computer user is able to launch additional SDI applications without further depleting the allocated system memory, while utilizing the benefits of the multi-tasking features of the operating system. Moreover, the overall computer system efficiency is increased because the operating system need only create and maintain a single copy of the GDI/font resource data irrespective of the number of processes connected to the system of the present invention.

BRIEF DESCRIPTION OF THE DRAWINGS

The present invention is described in detail below with reference to the attached drawings, wherein.

DETAILED DESCRIPTION OF THE INVENTION

Figure 1:
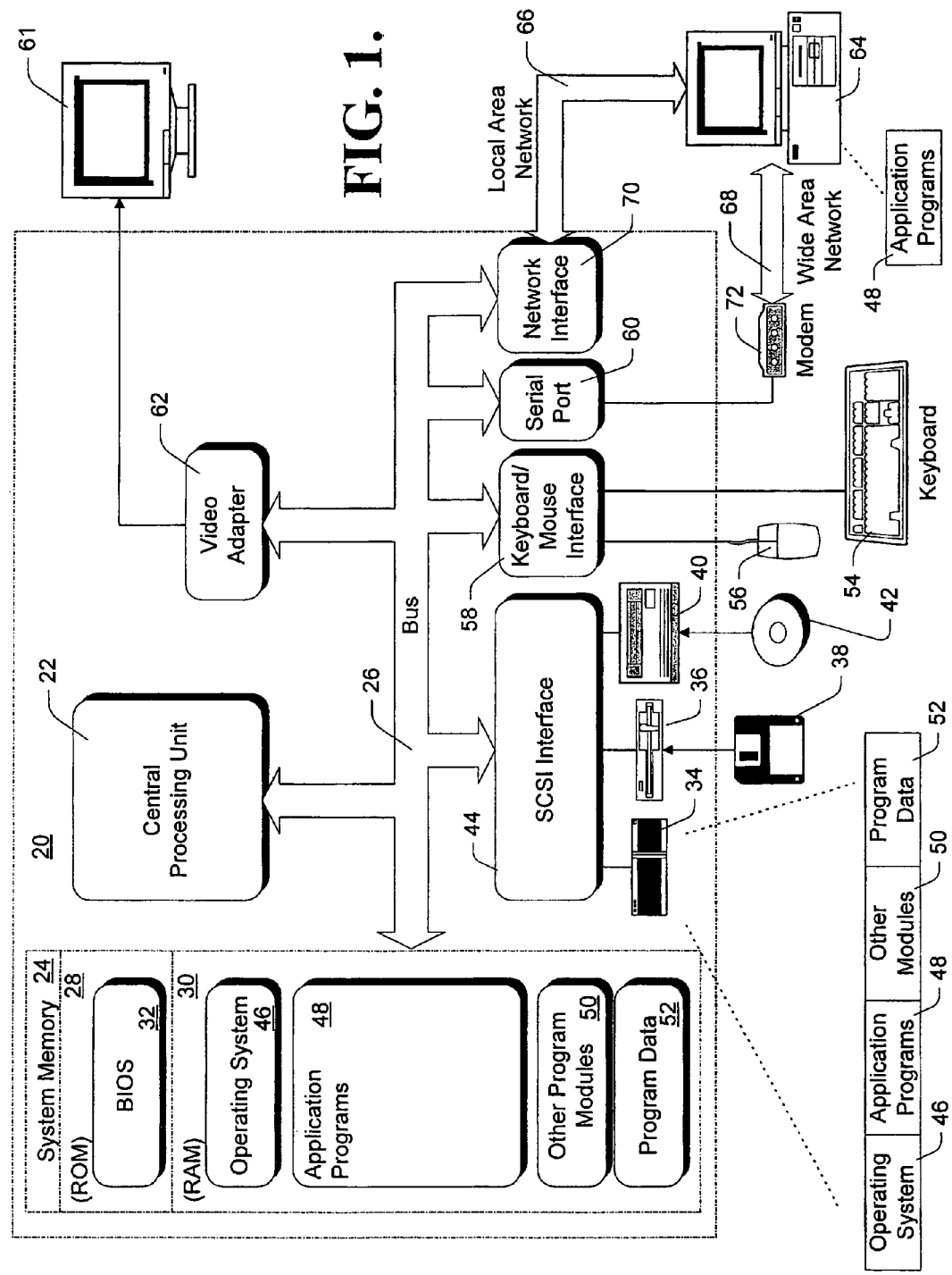
FIG. 1 is a block diagram of a computing system environment for use in implementing the present invention.

The present invention provides a system for the cross-process sharing of common resource data. FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 50 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 2:
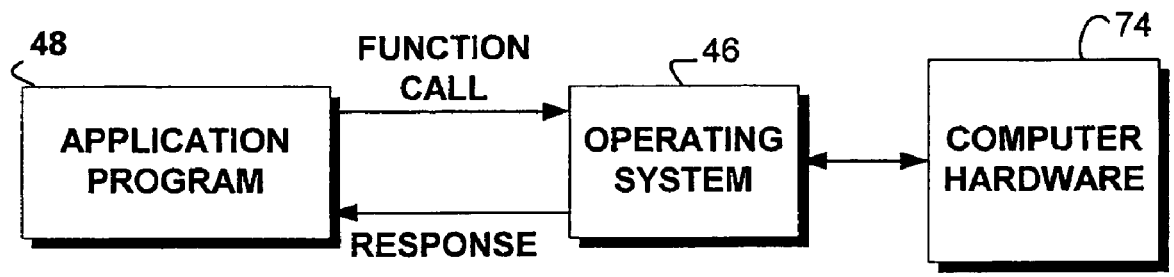
FIG. 2 is a block diagram illustrating the interface between various computer input/output devices, an operating system, and an application program.

FIG. 2 illustrates the interaction between the computer hardware 74, the operating system 46 and an application program 48. Referring now to FIGS. 1 and 2, the operating system 46 is loaded into RAM 30 when the computer 20 is turned on or reset. The operating system 46 provides the basic interface between the computer's resources, the user and the application program 48. The operating system 46 interprets and carries out instructions issued by the user. For example, when the user wants to load an application program 48, the operating system 46 interprets the instruction and causes the processing unit 22 to load the program from the hard disk drive 34 into the RAM 30. Once the application program 48 is loaded into RAM 30, it is executed by the processing unit 22. In the case of large programs, the processing unit 22 loads various portions of the program 48 into RAM 30 as needed.

The operating system 46 also provides a variety of functions or services that allow application program 48 to deal with various types of input/output (I/O). This allows an application program 48 to issue simple function calls that cause the operating system 46 to perform the steps required to accomplish the tasks, such as displaying text on the monitor 61.

With continued reference to FIG. 2, the application program 48 communicates with the operating system 46 by calling predefined function calls provided by the operating system 46. The operating system 46 responds by providing the requested information or executing the requested task.

The present invention relates to a method and structure for the cross-process sharing of computer system resource data. Specifically, a preferred embodiment of the present invention is a method and structure for the cross-process sharing of graphic device interface (GDI)/font resource data between one or more single document interface (SDI) applications, which are implemented as separate processes. Moreover, the invention will also be discussed with relation to each SDI application/process originating from a common base program. As would be readily understood by those skilled in the art, the present invention is applicable with other computer system resource data, as well as applicable for the sharing of computer system data between applications/processes launched from separate base programs. In addition to SDI applications, the present invention applies to other types of applications which are allotted common system resources.

Figure 3:
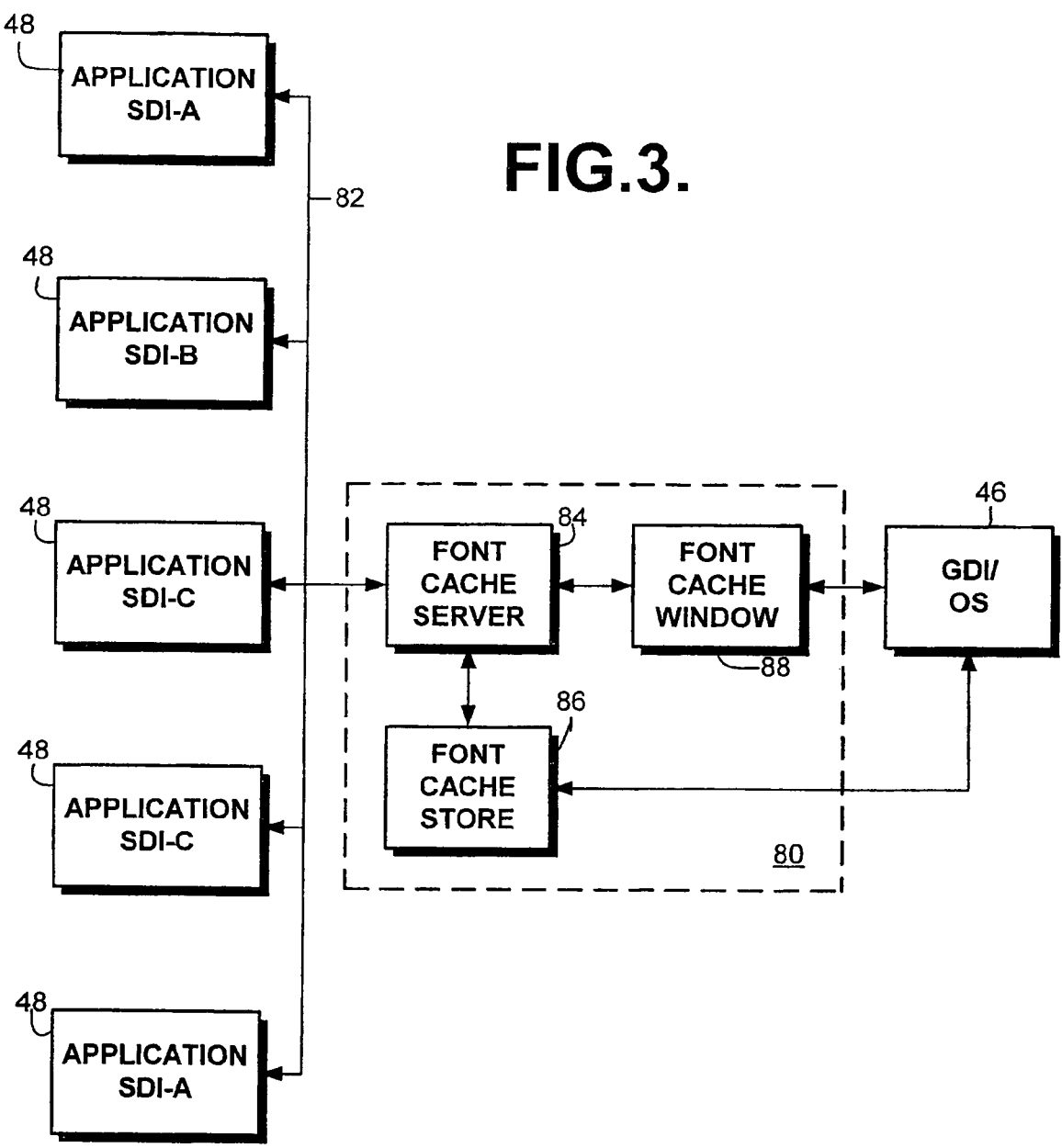
FIG. 3 is a block diagram illustrating the interaction between various single document interface application programs, an operating system and the cross-process server of the present invention.

FIG. 3 illustrates the interaction between SDI application programs 48, an operating system 46 and the cross-process server of the present invention, which is designated generally by the reference numeral 80. In general, one or more SDI application processes are connected to the cross-process server 80 via a communications link 82. As illustrated, communications link 82 may be a single communications bus, or could represent multiple communications sources.

The primary interface between the server 80 and the SDI applications 48 is a font cache server 84. The font cache server 84 creates a bi-directional communications link with each SDI application 48. Additionally, the font cache server 84 is the entry point for any SDI application GDI/font data request and the exit portal for all outgoing data and communications from the server 80.

With continued reference to FIG. 3, the font cache server 84 is also in communication with the font cache store 86. The store 86 serves as the data store for the GDI/font resource data obtained from a source, such as the operating system 46. The font cache store 86 maintains and manages at least one copy of the GDI/font resource data and can update the data as needed.

Also in communication with the font cache server 84 is a font cache window 88. The font cache window 88 is the primary communication means between the resource source, such as the operating system 46, and the cross-process server 80. The font cache window 88 monitors various communications from the operating system 46 and determines which communications require a response or activity from the cross-process server 80.

Figure 9:
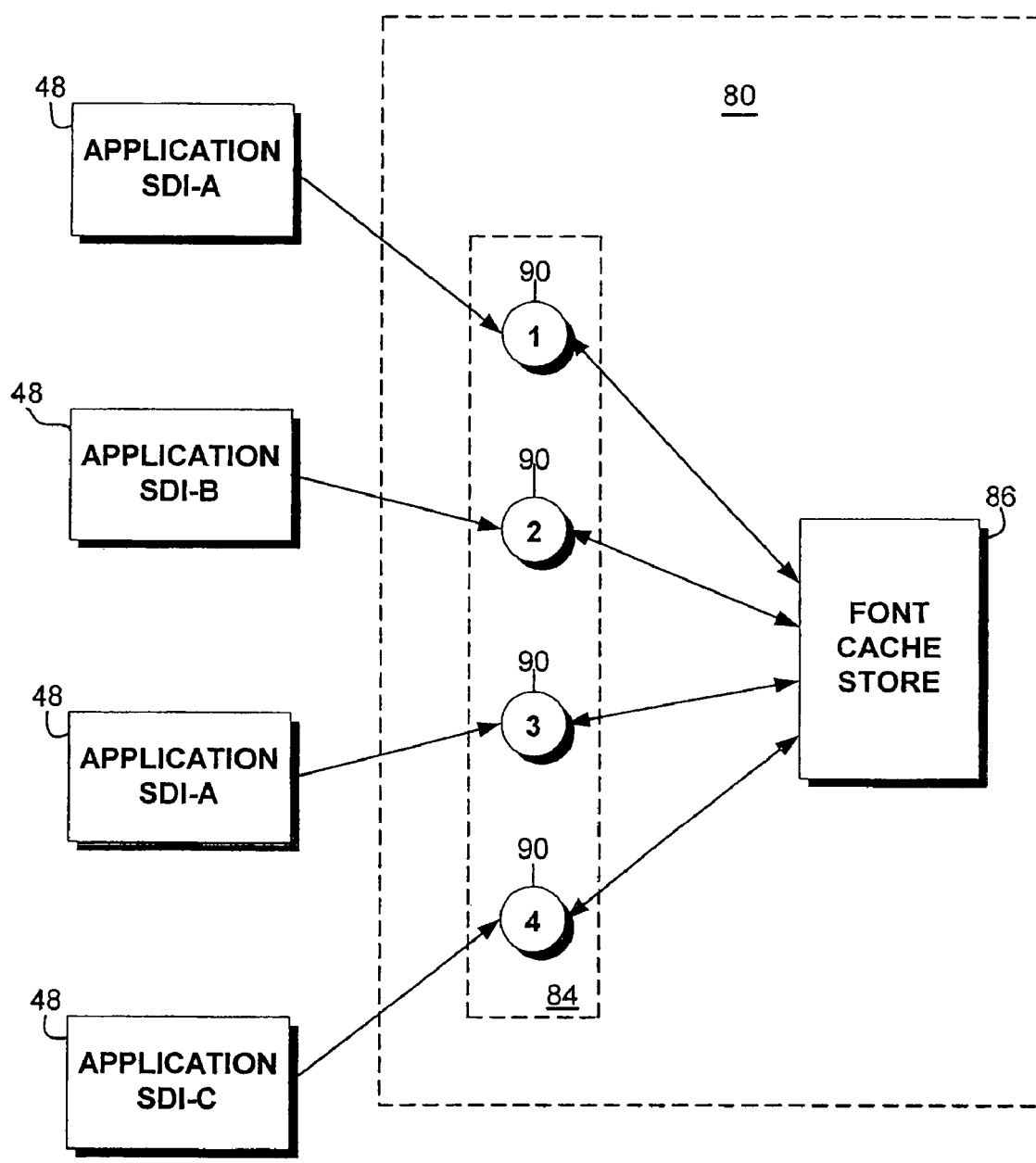
FIG. 9 is a block diagram illustrative of the communications link established by the font cache server of the present invention.

FIG. 9 is illustrative of the communications link established by the font cache server 84, the font cache store 86 and various SDI applications 48. The font cache server 84 establishes an individual communication point 90 between each SDI application 48. Moreover, each communication point 90 is further in communication with the font cache store 86. The font cache server 84 contains an exe-module in which each communication point 90 is preferably configured as a separate communications object thread. Thus, each SDI application 48 is allocated its own communication object to transfer data to and from the server 80.

The GDI/font resource data preferably includes system font and associated font data such as font names, character sets, available font sizes, text metrics, font style, font scripts, pens, brushes, and logical font structures. All such data is stored in the font cache store 86 either as data in memory, or in the case of fonts, as handles to the memory location located in the system memory 24. As would be readily understood, additional or different GDI/font resource attributes are also considered within the scope of the present invention.

Figure 7:
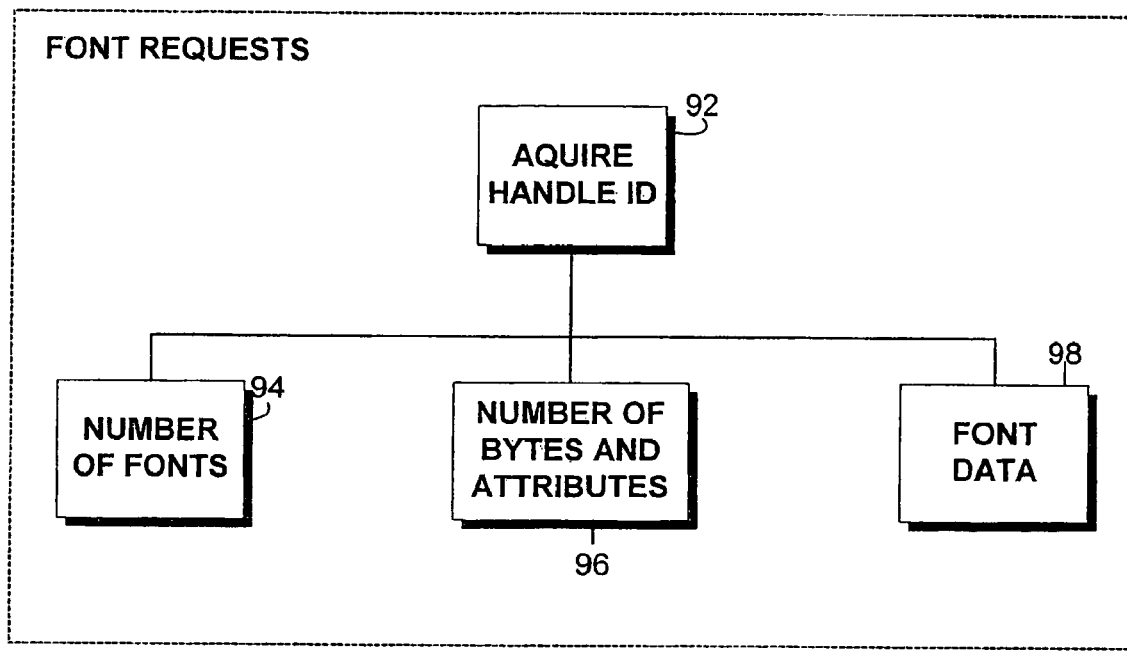
FIG. 7 is a block diagram illustrating the hierarchical structure of the graphic device interface/font data request utilized by the present invention.

With reference to FIG. 7, each SDI application 48 may initiate various font requests to the server 80 via the font cache server 84. The font requests first include a request for the handle 92 to a specific font, or sets of fonts. Without a proper font handle 92, the server 80 cannot properly provide any additional attributes or data on the font. With knowledge of the appropriate font handle 92, the SDI application 48 may then request additional font data such as the number of fonts 94 accessible by the application 48, the number of bytes required to store the data and/or its attributes 96, and the actual font data 98. The specific categories within the data request would vary depending on the type of data being stored and the specific organization of the data. For example, in the event that the font cache store 86, or similar structure, were to contain various types of data, or multiple copies, the data requests would include various additional identifiers. Additionally, the font data requests may include multiple data requests which can either be processed concurrently or sequentially by the font cache store 84.

Figure 8:
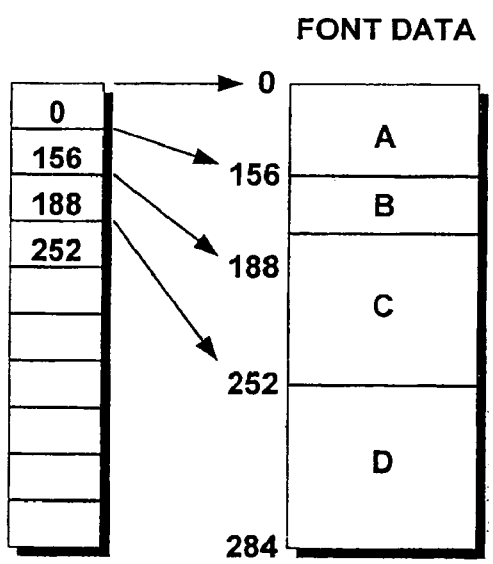
FIG. 8 is a diagram illustrating the transfer of the graphic device interface/font data by fast access array.

Preferably, the GDI/font data may be transferred from the font cache store 86 as blocks of data. Alternatively, and as illustrated in FIG. 8, a fast access array may be utilized to access and transfer selected data blocks. As would be generally understood, non-uniform size GDI/font resource data is stored in memory 24 either sequentially or in various pieces. As illustrated, data block A is 156 K in size, while data block B is only 32 K in size. Thus, to locate and transfer data block B, data block A must be read until the end is found. Each sequential data block would require additional searching. The present invention incorporates a fast array which includes a single array having the offset values of the starting points of each sequential data block in ascending order from the base address of the font data block. The array values are not absolute addresses, but relative addresses which are translated by the clients. With reference to the example, to locate the beginning of data block D, the relative address of the data block is located at the fourth location in the fast access array.

Figure 4:
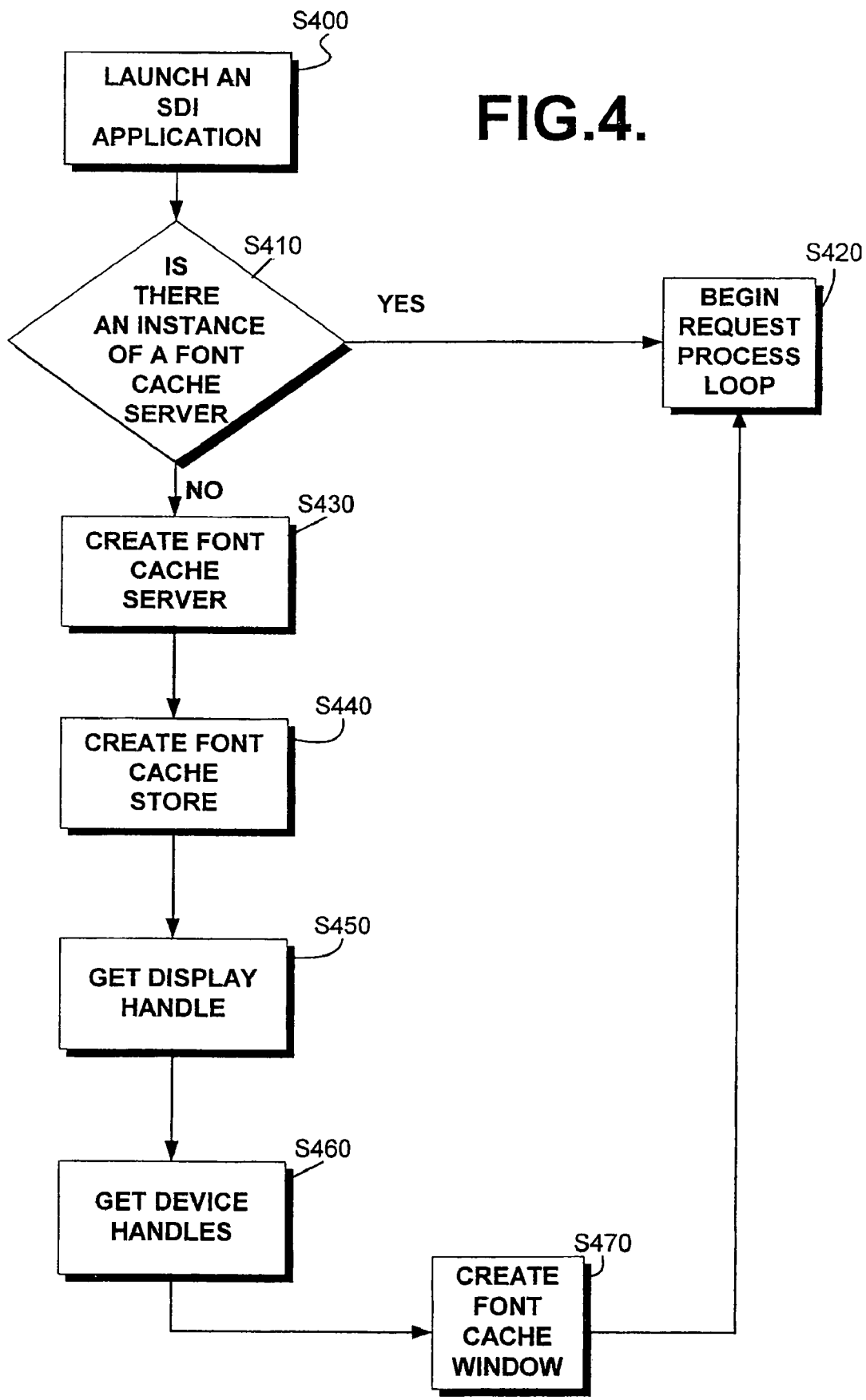
FIG. 4 is a flowchart of the initialization method implemented by the cross-process server of the present invention.

FIG. 4 is a flow diagram of the initialization method implemented by the cross-process server of the present invention.

As would be generally understood, a base program must first be initialized in the operating environment of the operating system 46. After initializing the base program, the user is then able to launch one or more of the SDI applications from within the base program. Preferably, the SDI applications include a word processing application, a spreadsheet application, and a database application. Of course, the incorporation of different numbers or kinds of applications is within the scope of the present invention.

In S400, the base program launches an SDI application. Upon initialization, the processing unit 22 determines at S410 whether there is an instance of the font cache server 84 already created and running. If so, another communications link 90 is established with the font cache server 84 and the server 80 will follow into a request process loop in S420.

In the event that at S410 there is not an instance of a font cache server 84 created, the method begins an initialization of the server 80 of the present invention. In S430, a function call is sent to the operating system 46 to create an instance of the font cache server. Additionally, a function call is sent to the operating system 46 to create an instance of the font cache store in S440.

Upon the operating system creating these two structures of the server 80, the method continues with the acquisition of the GDI/font resource data which is stored in the font cache store. In S450, the display handle GDI/font data is obtained. In S460, the device handle GDI/font data is obtained. In both steps, the method illustrated in FIG. 5 is utilized to obtain the appropriate GDI/font data.

Figure 5:
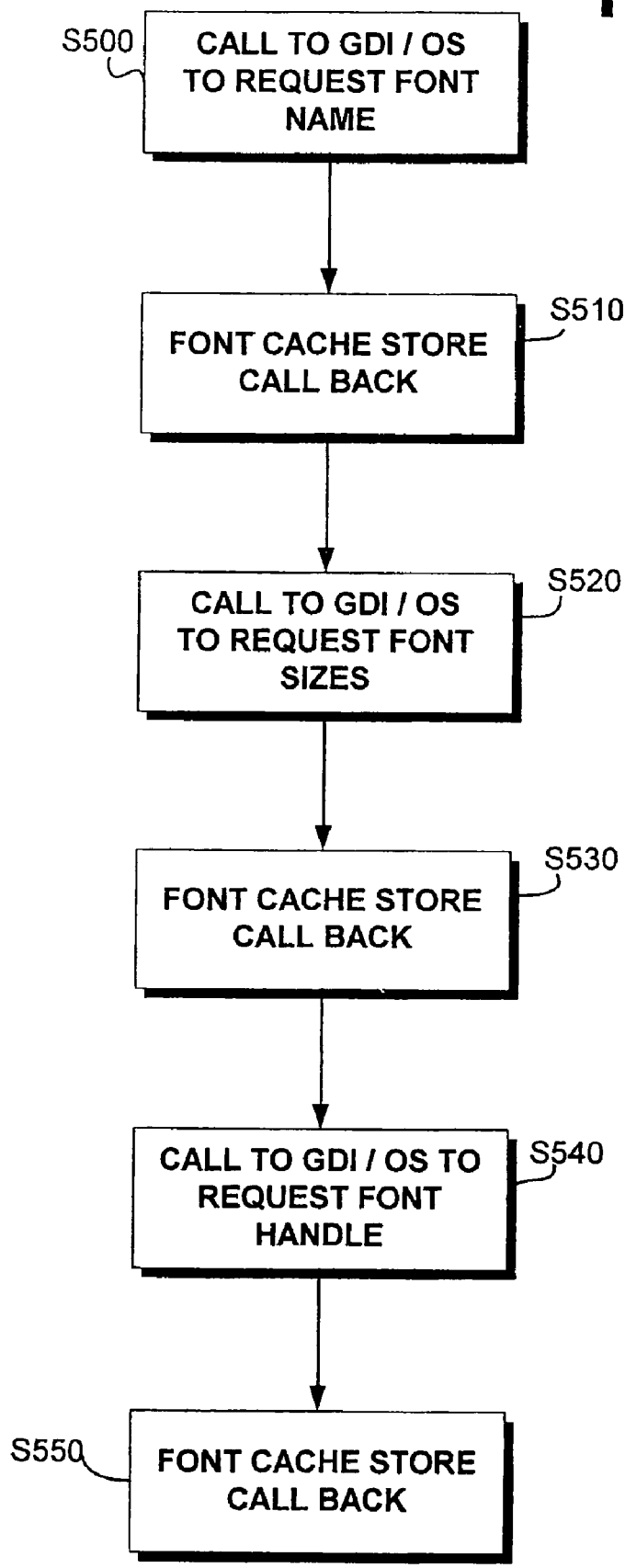
FIG. 5 is a flow diagram of a method of acquiring graphic device interface/font information in accordance with the present invention.

With reference to FIG. 5, the acquisition of font data for devices and displays entails multiple system calls to the operating system 46 to obtain a copy of the GDI/font resource data. In S500, the server 80 calls the operating system, or other resource source, to request the names of the fonts available. The operating system 46 returns the requested font name data to the font cache store 86 in S510. This is referred to herein as a "Font Cache Store Call Back." Next, the server 80 calls the operating system 46 to request the font size data. Similarly, the operating system 46 returns the font size data in S530. Next, in S540, the server 80 requests the font handle data. The operating system 46 returns the data at S550. As would be understood, different ordered requests and additional or varying data request procedures are within the scope of the present invention.

Returning to FIG. 4, upon obtaining the GDI/font data for the devices and displays, a function call is sent to the operating system 46 to create an instance of the font cache window 88 in S470. Finally, after the creation of the font cache window 88, the system has completed the initialization of the server 80 and the server enters in the request process loop in S420.

Figure 6:
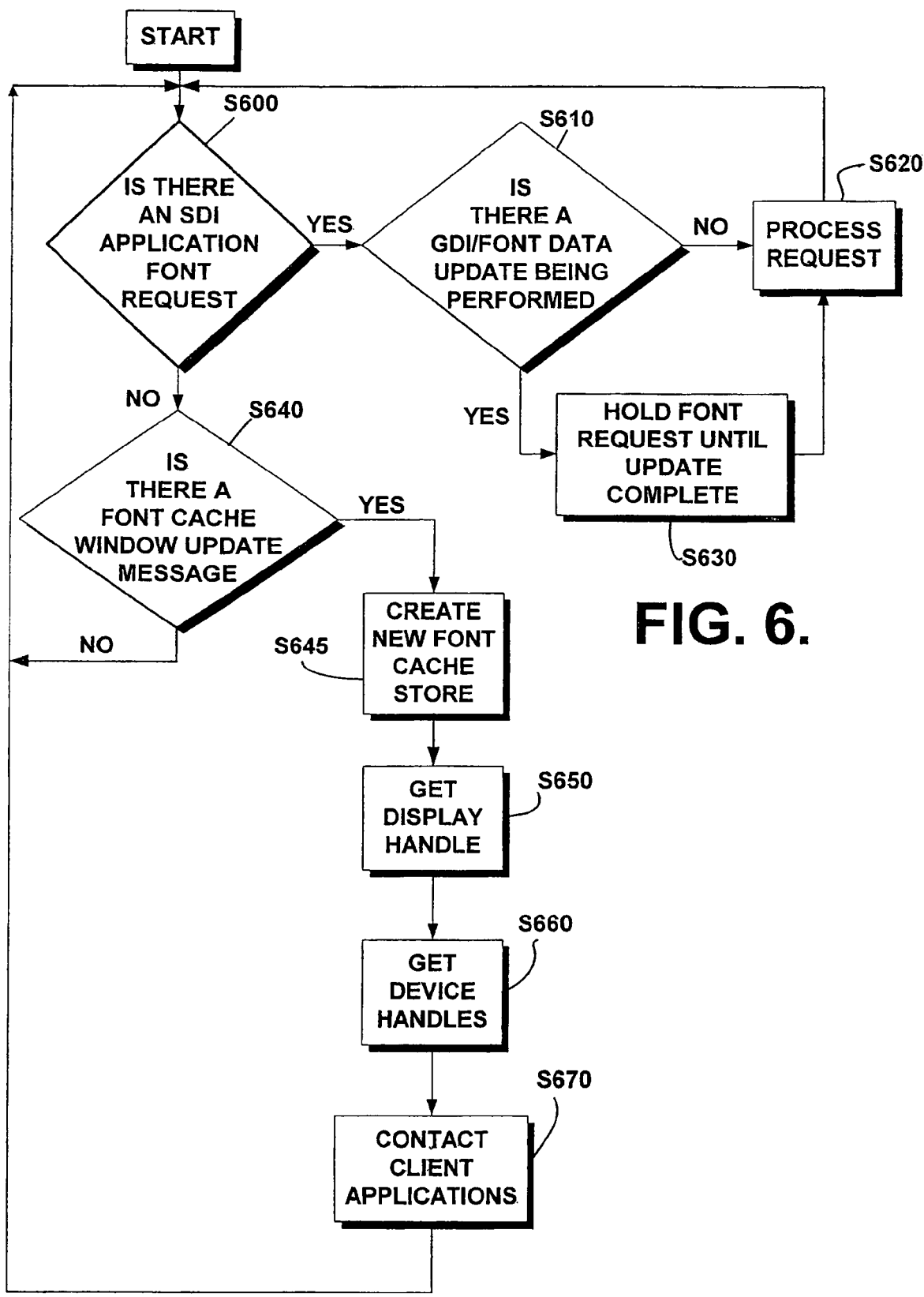
FIG. 6 is a flowchart of the graphic device interface/font data request processing method of the present invention.

FIG. 6 illustrates the request process loop (S420) implemented by the server 80 of the present invention. In general, the request process loop entails polling functions for SDI application GDI/font data requests and font cache window update messages. In S600, the server 80 checks whether there are any SDI application GDI/font data requests. If so, then server 80 checks whether there is a GDI/font data update function being performed by the server 80 at S610. If there is no update function being performed, the server 80 processes the GDI/font data request in S620.

If at S610 there is an update function being performed, the server 80 will hold the GDI/font data request in S630 until the update is complete. The server 80 will then process the request in S620.

If at S600 there is no SDI application font request, the server 80 will check if there is a font cache window update data message at S640. If not, the server 80 returns to S600 and repeats the request process loop. If there is a font cache window update message at S640, the server 80 must obtain a new copy of the GDI/font data stored in the font cache store 86. At S645, a new font cache store is created, which preferably includes the destruction of the current font cache store and the regeneration of a new font cache store. With reference to FIGS. 5 and 6, at S650 and S660, the server 80 will request and process an entire new copy of the resource data by following S500 through S550 for both the devices and the displays configured on computer 20. As would be understood, the server 80 could also update only portions of the data.

Once the new GDI/font data is acquired from the data source, the server 80 contacts all the SDI applications in S670 to request that they update their GDI/font data. The server 80 broadcasts a message via the font cache server to all SDI applications 48 to have them request the new font data in a subsequent font data request. Alternatively, the server 80 could broadcast all or part of the new data to be updated. Upon completion of S670, the server returns to S600 and repeats the request process loop.

Preferably, the cross-process constrained resource data sharing system of the present invention is implemented in Microsoft Corporation's "WORKS 2000™" software platform which creates multiple instances of word processing, database and/or spreadsheet applications as SDI application from the base system. By utilizing the cross-process resource sharing method and structure of the present invention, each additional instance of the word processor, database or spreadsheet does not further deplete constrained computer system memory or decrease processor efficiencies in creating multiple copies of the same GDI/font resource data. Additionally, although many program languages could be used to create the objects and functions of the present invention, the present invention may preferably be coded by an object oriented language such as Microsoft Corporation's "VISUAL C++®" OR "VISUAL BASIC®" programming languages.

The present invention has been described in relation to a cross-process GDI/font resource sharing system which is intended to be illustrative rather than restrictive. For example, the structures and methods could be implemented by a variety of software platforms to share between processes any common system resource. Additionally, as would be understood, the present invention is preferably directed toward a computer system in which the shared data is valid in both the process server and in the individual client process. For example, in one embodiment, both GDI and font data is shared by the applications, while in an alternative embodiment, only font data is shared by the application due to operating system restrictions. In summary, the cross-process constrained resource data sharing could be implemented in any variety of single application platforms (e.g., word processing programs) or multiple application platforms.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A computer readable storage medium storing computer executable instructions that, when executed by a processor, facilitate a method for sharing graphics device interface (GDI)/font resource data between multiple instances of single document interface (SDI) applications, the method comprising:

obtaining a single shared copy of the GDI/font resource data from a source of system resources;

creating an instance of a central server and a central font cache store and storing the single shared copy in the central font cache store, the single shared copy being configured to allow concurrent accessing and sharing by the multiple instances of SDI applications;

receiving font data process requests from the SDI applications through communications between a separate communications link associated with each of the multiple instances and the central server, wherein receiving font data process requests further includes establishing a separate communications interface for each SDI application;

processing the font data requests through the central server using the shared copy of the GDI/font resource data and transferring the font data requests to a central font cache store having stored thereto the shared copy of the GDI/font resource data; and communicating the processed font data to the SDI applications by transferring at least a portion of the GDI/font resource data from the central font cache store to the applications utilizing a fast access array, wherein the GDI/font resource data includes a system handle to a system font and at least one attribute of the system font.

2. The computer-readable storage medium as recited in claim 1, further comprising refreshing the resource data.

3. The computer-readable storage medium as recited in claim 2, wherein said refreshing step includes:

creating a resource data update window;

receiving communications from a resource data source; and obtaining a new copy of the resource data.

4. The computer-readable storage medium as recited in claim 3, wherein said step of receiving communications from the source includes receiving an update resource data message from an operating system.

5. The computer-readable storage medium as recited in claim 4, wherein the update resource data message is an update graphics display interface/font resource data message.

6. The computer-readable storage medium as recited in claim 4, further comprising communicating to the SDI applications commands to acquire the new copy of the GDI/font resource data.

7. The computer-readable storage medium as recited in claim 1, wherein each instance of the single document interface applications is selected from a group consisting of a word processing application, a spreadsheet application and a database application.

8. The computer-readable storage medium as recited in claim 7, wherein the single document interface applications are created from a single software platform.

* * * * *

UNITED STATES PATENT AND TRADEMARK OFFICE
CERTIFICATE OF CORRECTION

PATENT NO.       : 7,665,091 B2
APPLICATION NO.  : 11/032102
DATED            : February 16, 2010
INVENTOR(S)      : Venkatraman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1438 days.

Signed and Sealed this

Seventh Day of December, 2010

David J. Kappos
*Director of the United States Patent and Trademark Office*